Patented Jan. 15, 1952

2,582,256

UNITED STATES PATENT OFFICE 2,582,256

ESTERS OF ALPHA-PIPERIDINO ALPHA CYCLOHEXYL ACETIC ACID AND THEIR PRODUCTION

Eldon M. Jones, Grosse Pointe Woods, Mich., assignor to Parke, Davis & Company, Detroit, Mich., a corporation of Michigan No Drawing. Application September 15, 1950, Serial No. 185,164

6 Claims. (Cl. 260—294.3)

This invention relates to esters of a basically substituted aliphatic acid, their acid addition salts, and to methods for obtaining the same. More particularly, the invention relates to the group of α-piperidino-substituted cyclohexylacetic acid esters having, in the free base form, the formula,

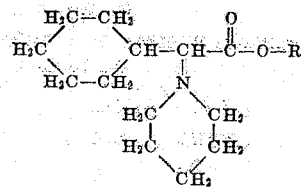

where R is a methyl, ethyl, isopropyl or n-butyl radical.

In accordance with the invention, α-piperidino-substituted cyclohexylacetic acid esters having the above formula are produced by reacting piperidine with a lower alkyl ester of an α-halogenated cyclohexylacetic acid of formula,

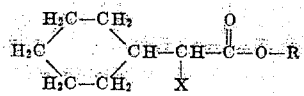

where X is a halogen atom and R has the same significance as given above. In carrying out the reaction, it is preferable to employ at least two moles of piperidine or one mole of piperidine with at least one mole of a strongly basic substance such as an alkali metal carbonate or bicarbonate, an alkaline earth metal carbonate or bicarbonate, a tertiary organic amine, and the like. The temperature of the reaction is not particularly critical and can vary from about 10° to 100° C. The reaction can be carried out in the presence or absence of an inert organic solvent such as a lower aliphatic alcohol, ether, ester, ketone, glycol, hydrocarbon, halogenated hydrocarbon, and the like.

The lower alkyl esters of α-halogenated cyclohexylacetic acids used as starting materials need not be in pure form. For example, the crude esters obtained by the reaction of a lower aliphatic alcohol with an α-halogenated cyclohexylacetyl halide of the formula,

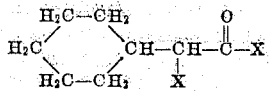

where X is a halogen atom, can be used without further purification. In carrying out the esterification reaction the α-halogenated cyclohexylacetyl halide is added slowly to an excess of the alcohol to be esterified, either in the presence or absence of an inert organic diluent such as ether, dioxane, petroleum ether, benzene, toluene, and the like. After this addition is complete and the spontaneous reaction has subsided, the reaction may be completed by the external application of heat but in most instances this will be unnecessary. It is equally satisfactory to reverse the order given above for the mixing of the reactants; i. e., an excess of the alcohol to be esterified can be added to the α-halogenated aliphatic acyl halide, either in the presence or absence of an inert organic diluent, as above.

The α-piperidino-substituted cyclohexylacetic acid esters of the invention are basic in nature and form acid addition salts with organic and inorganic acids such as hydrochloric, hydrobromic, hydriodic, sulfuric, phosphoric, sulfamic, tartaric, oxalic, benzoic, citric, picric, acetic, maleic, and the like acids. The free bases, as well as the non-toxic acid addition salts, are of particular value in the alleviation of pain. Their analgetic activity is of a high degree, exceeding even that of morphine. They may be administered either orally or parenterally.

The invention is illustrated by the following examples:

Example 1

A mixture consisting of 24.9 g. of ethyl α-bromocyclohexylacetate, 17 g. of piperidine and 100 ml. of absolute ethanol is allowed to stand for one day at room temperature and is then refluxed for 5 hrs. The alcohol is removed by distillation, the residue dissolved in 200 ml. of ether and the ether solution extracted with excess 20% aqueous hydrochloric acid. The aqueous acid extract is washed with ether, made basic with aqueous ammonia, and then extracted with ether. After drying the ether extract over anhydrous potassium carbonate, the ether is removed by distillation. Vacuum distillation of the residue yields the desired ethyl α-piperidinocyclohexylacetate of formula,

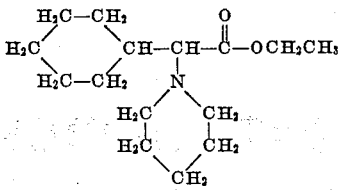

in pure form.

A dry ether solution of 5 g. of ethyl α-piperidinocyclohexylacetate is treated with an excess of gaseous hydrogen chloride. The white hydrochloride salt of ethyl α-piperidylcyclohexylacetate which separates is collected and purified by recrystallization from a mixture of ether and ethanol; M. P. 160–2° C.

*Example 2*

28.4 g. of α-bromocyclohexylacetyl bromide is added dropwise to 200 ml. of methanol and the resulting solution stirred for one hour. After the addition of 10.6 g. of anhydrous sodium carbonate, the solution is then treated with 17 g. of piperidine. The reaction mixture is stirred for one day and the methanol removed by distillation. The residue is diluted with 500 ml. of ether, filtered and the ether filtrate washed several times with water. The ether solution is extracted with excess 10% aqueous hydrochloric acid, the aqueous acid extract made basic with aqueous ammonia and the resulting alkaline solution extracted with ether. The ether extract is dried over anhydrous magnesium sulfate and the ether is removed by distillation. Vacuum distillation of the residue yields the desired methyl α-piperidinocyclohexylacetate of formula,

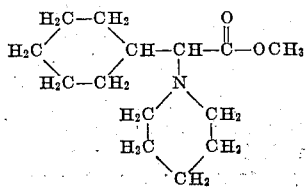

in pure form.

A dry ether solution of 10 g. of methyl α-piperidinocyclohexylacetate is treated with excess gaseous hydrogen bromide. The white hydrobromide salt of methyl α-piperidinocyclohexylacetate which separates is collected and purified by recrystallization from absolute methanol.

A dry ether solution of 5 g. of methyl piperidinocyclohexylacetate is treated with an excess of gaseous hydrogen chloride. The white hydrochloride salt of methyl α-piperidinocyclohexylacetate which separates is collected and purified by recrystallization from absolute methanol.

*Example 3*

28.4 g. of α-bromocyclohexylacetyl bromide is added dropwise to 300 ml. of isopropanol and the resulting solution is stirred for one hour. After the addition of 10.6 g. of anhydrous sodium carbonate, the solution is treated with 34.0 g. of piperidine, and the mixture refluxed for eight hours. The isopropanol is removed by distillation and the residue diluted with 300 ml. of ether. The ether solution is filtered, the filtrate washed with water and then extracted with excess 10% aqueous hydrochloric acid. The aqueous acid extract is made basic with aqueous ammonia and the solution extracted with ether. The ether extract is dried over anhydrous magnesium sulfate and the ether removed by distillation. Vacuum distillation of the residue yields the desired isopropyl α-piperidinocyclohexylacetate of formula,

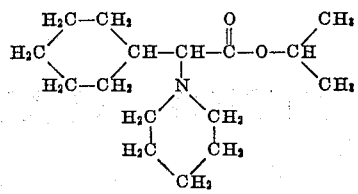

in pure form.

A dry ether solution of 10 g. of isopropyl α-piperidinocyclohexylacetate is treated with an excess of gaseous hydrogen chloride. The white hydrochloride salt of isopropyl α-piperidinocyclohexylacetate which separates is collected and purified by recrystallization from methanol.

*Example 4*

28.4 g. of α-bromocyclohexylacetyl bromide is added dropwise to 300 ml. of n-butanol and the resulting solution is stirred for one hour. After the addition of 10.6 g. of anhydrous sodium carbonate, the solution is treated with 34.0 g. of piperidine and the mixture stirred for sixteen hours. The butanol is removed by vacuum distillation and the residue remaining is diluted with 300 ml. of ether. The ether solution is filtered, the filtrate washed with water and then extracted with excess 10% aqueous hydrochloric acid. The aqueous acid extract is made basic with aqueous ammonia and the solution extracted with ether. The ether extract is dried over anhydrous potassium carbonate and the ether removed by distillation. Vacuum distillation of the residue yields the desired n-butyl α-piperidinocyclohexylacetate of formula,

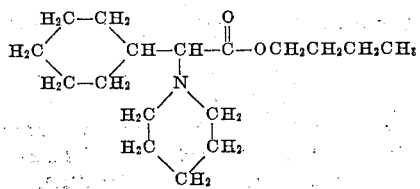

in pure form.

40.8 g. of the pure n-butyl α-piperidinocyclohexylacetate is dissolved in 100 ml. of 2N sulfuric acid and the resulting solution evaporated to dryness in vacuo. The residual white sulfate salt of n-butyl α-piperidinocyclohexylacetate is purified by recrystallization from aqueous ethanol.

An ether solution of 10 g. of n-butyl α-piperidinocyclohexylacetate is treated with an excess of gaseous hydrogen chloride. The hydrochloride salt of n-butyl α-piperidinocyclohexylacetate which separates is collected and purified by recrystallization from ethyl acetate.

What I claim is:

1. A compound of the class consisting of a free base and its acid addition salts, said free base having the formula,

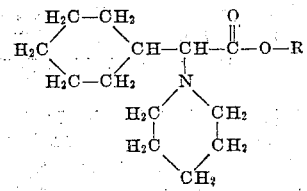

where R is a member of the class consisting of methyl, ethyl, isopropyl and n-butyl radicals.

2. The hydrochloride salt of ethyl α-piperidinocyclohexylacetate.

3. The hydrochloride salt of methyl α-piperidinocyclohexylacetate.

4. The hydrochloride salt of isopropyl α-piperidinocyclohexylacetate.

5. The hydrochloride salt of n-butyl α-piperidinocyclohexylacetate.

6. Process for obtaining a compound of formula,

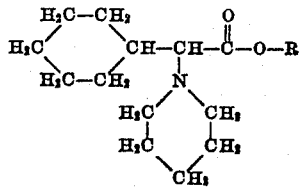

which comprises reacting a compound of the formula,

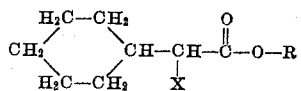

with piperidine; where X is a halogen atom and R is a member of the class consisting of methyl, ethyl, isopropyl and n-butyl radicals.

ELDON M. JONES.

(No references cited.)